United States Patent
Chen

(10) Patent No.: US 11,054,642 B2
(45) Date of Patent: Jul. 6, 2021

(54) OPTICAL BINOCULARS

(71) Applicant: Changing International Company Limited, Kowloon (HK)

(72) Inventor: Han-Che Chen, Taipei (TW)

(73) Assignee: CHANGING INTERNATIONAL COMPANY LIMITED, Kowloon (HK)

( * ) Notice: Subject to any disclaimer, the term of this patent is extended or adjusted under 35 U.S.C. 154(b) by 0 days.

(21) Appl. No.: 16/886,005

(22) Filed: May 28, 2020

(65) Prior Publication Data

US 2021/0141219 A1 May 13, 2021

(30) Foreign Application Priority Data

Nov. 11, 2019 (CN) .......................... 201911095296.9

(51) Int. Cl.
G02B 27/01 (2006.01)

(52) U.S. Cl.
CPC ..... *G02B 27/0101* (2013.01); *G02B 27/0172* (2013.01); *G02B 2027/0112* (2013.01); *G02B 2027/0132* (2013.01)

(58) Field of Classification Search
CPC ............ G02B 27/0101; G02B 27/0172; G02B 2027/0132; G02B 2027/0112
See application file for complete search history.

(56) References Cited

U.S. PATENT DOCUMENTS

| | | | | | |
|---|---|---|---|---|---|
| 4,972,394 | A | * | 11/1990 | DiMarco | G04B 19/30 368/10 |
| 5,561,557 | A | * | 10/1996 | Le Bris | G02B 23/12 250/214 VT |
| 6,088,053 | A | * | 7/2000 | Hammack | G02B 23/18 348/61 |
| 2005/0092923 | A1 | | 5/2005 | Fantone et al. | |

(Continued)

FOREIGN PATENT DOCUMENTS

| CN | 203258583 U | 10/2013 |
|---|---|---|
| CN | 206347322 U | 7/2017 |

(Continued)

OTHER PUBLICATIONS

Extended European Search Report dated Feb. 5, 2021 in EP Application No. 20184196.2, 8 pages.

*Primary Examiner* — Patrick N Edouard
*Assistant Examiner* — Joseph P Fox
(74) *Attorney, Agent, or Firm* — Muncy, Geissler, Olds & Lowe, P.C.

(57) ABSTRACT

An optical binocular is provided, including a main body, a lens module, a display module, a first light source assembly and a second light source assembly. The lens module is disposed on one side of the main body. The display module is disposed in the main body and electrically connected to the lens module, and is configured to display an image. The first light source assembly includes a first light source and a first lens, and emits a first light. The second light source (Continued)

assembly includes a second light source and a second lens, and emits a second light. The first light source emits a long-range light through the first lens, and the second light source emits a close-range light through the second lens, wherein the focal length of the first lens is greater than the focal length of the second lens.

12 Claims, 4 Drawing Sheets

(56) References Cited

U.S. PATENT DOCUMENTS

| | | | | |
|---|---|---|---|---|
| 2006/0119540 | A1* | 6/2006 | Dobson | G02F 1/1336 345/8 |
| 2010/0313335 | A1* | 12/2010 | Waters | H04N 13/207 2/209.13 |
| 2016/0131922 | A1* | 5/2016 | Nagahara | G02B 26/0816 359/407 |
| 2018/0113302 | A1* | 4/2018 | Wu | G02B 5/005 |
| 2020/0218120 | A1* | 7/2020 | Narushima | G02B 27/0101 |

FOREIGN PATENT DOCUMENTS

| | | |
|---|---|---|
| EP | 3467564 A2 | 4/2019 |
| EP | 3467564 A3 | 6/2019 |

\* cited by examiner

OPTICAL BINOCULARS

CROSS REFERENCE TO RELATED APPLICATIONS

This application claims the benefit of China Application No. 201911095296.9, filed on Nov. 11, 2019, the entirety of which is incorporated by reference herein.

BACKGROUND OF THE INVENTION

Field of the Invention

The application relates in general to an optical binocular, and in particular to an optical binocular that includes two light source assemblies.

Description of the Related Art

Thanks to the ongoing development of technology, electronic products such as optical binoculars/monocular are becoming increasingly versatile. With continuous improvements in performance, the application of these devices will improve. For example, the optical binoculars/monocular used in hunting are equipped with night-vision functionality and uses its infrared light emitting unit to emit infrared light, which can be used at night. However, users demand high quality and versatility from their binoculars/monocular to meet their needs. Therefore, it is an important issue to provide a device that is more user-friendly and widely used.

BRIEF SUMMARY OF INVENTION

To address the deficiencies of conventional optical binocular, an embodiment of the invention provides an optical binocular, including a main body, a lens module, a display module, a first light source assembly and a second light source assembly. The lens module is disposed on one side of the main body. The display module is disposed in the main body and electrically connected to the lens module, and is configured to display an image captured via the lens module. The first light source assembly includes a first light source and a first lens, and emits a first light. The second light source assembly includes a second light source and a second lens, and emits a second light. The first light source emits a long-range light which passes through the first lens, and the second light source emits a close-range light which passes through the second lens, wherein the focal length of the first lens is greater than the focal length of the second lens.

In some embodiments, the first lens is a plano-convex lens, and the first light source emits the long-range light through the plano-convex lens.

In some embodiments, the second lens is a convexo-plane lens, and the second light source irradiates the close-range light through the convexo-plane lens.

In some embodiments, there is a space between the first light source and the first lens, and the space has a tapered structure.

In some embodiments, the second light source assembly includes a condensing cup body, and the convexo-plane lens is disposed in the condensing cup body.

In some embodiments, there is a first distance between the first light source and the first lens, and the first distance is from 18 to 20 mm.

In some embodiments, there is a second distance between the second light source and the second lens, and the second distance is from 4.5 to 5.5 mm.

In some embodiments, the first distance is greater than the second distance by at least 12.5 mm.

In some embodiments, the optical binocular further includes an eyepiece assembly, and the main body includes a first side and a second side, and the first side is opposite the second side, the lens module, wherein the first light source assembly and the second light source assembly are disposed on the first side, and the eyepiece assembly is disposed on the second side.

In some embodiments, the display module is disposed between the lens module and the eyepiece assembly in the direction of an optical axis of the lens module.

In some embodiments, the eyepiece assembly has an eyepiece lens, and the eyepiece lens is a biconvex lens.

In some embodiments, there is an observation room between the display module and the eyepiece assembly, the observation room has a first opening and a second opening, the first opening is adjacent to the eyepiece assembly, the second opening is adjacent to the display module, wherein the second opening is smaller than the first opening.

In some embodiments, the observation room has an inner wall, and the inner wall has a scattering structure.

In some embodiments, the optical binocular further comprises a plurality of buttons disposed on the upper side of the body, wherein the buttons are configured to operate the lens module, the display module, the first light source assembly and the second light source assembly.

In some embodiments, the display module has a liquid-crystal display (LCD) panel.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
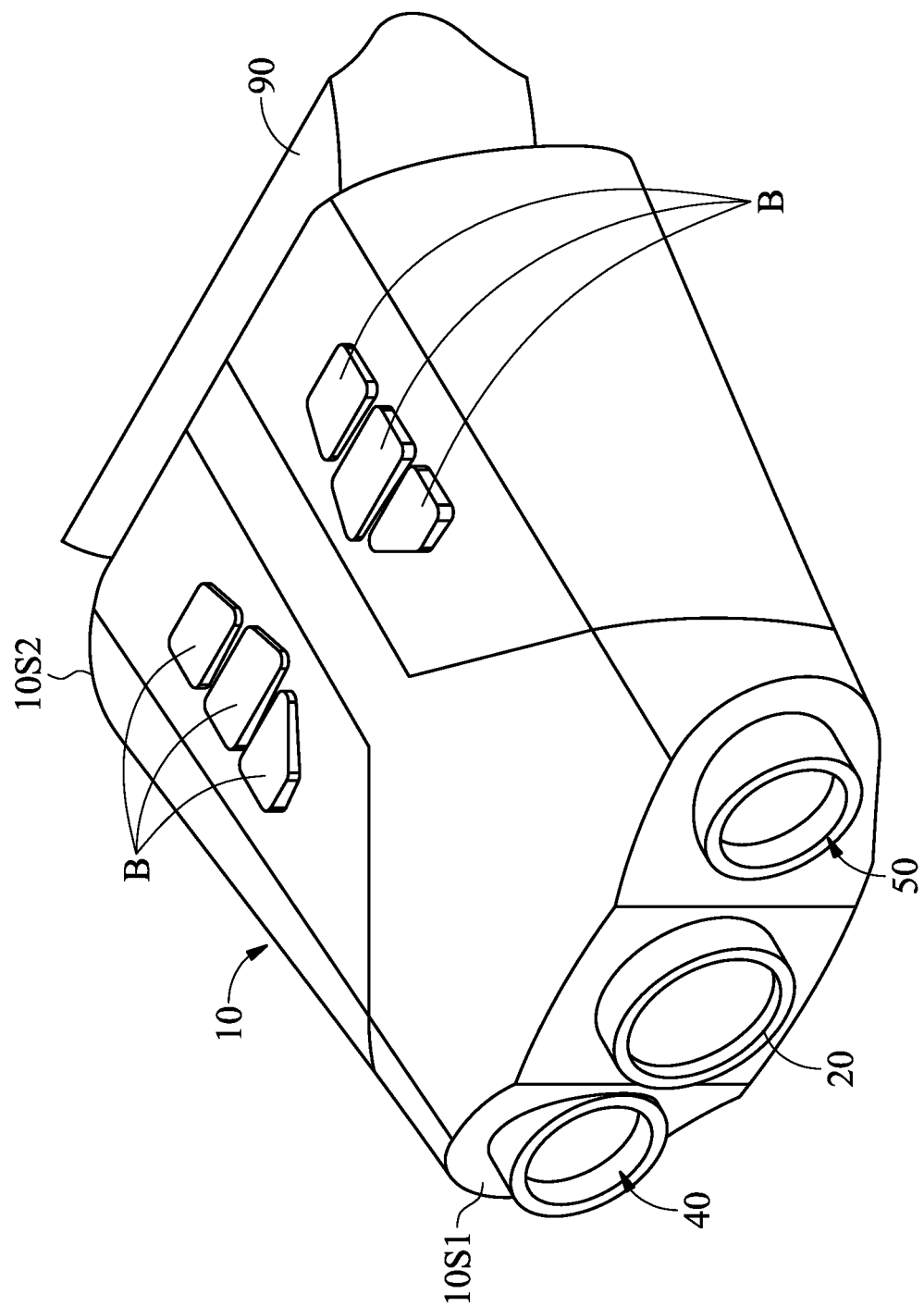
FIG. 1 is a front perspective view diagram of an optical binocular according to an embodiment of the invention.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that elements specifically described or illustrated may exist in various forms well known to those skilled in the art. In addition, when a layer is "on" another layer or substrate, it may mean "directly" on the other layer or substrate, or it may mean that another layer is interposed between the certain layer and the other layer or substrate.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The making and using of the embodiments of the optical binocular devices are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 2:
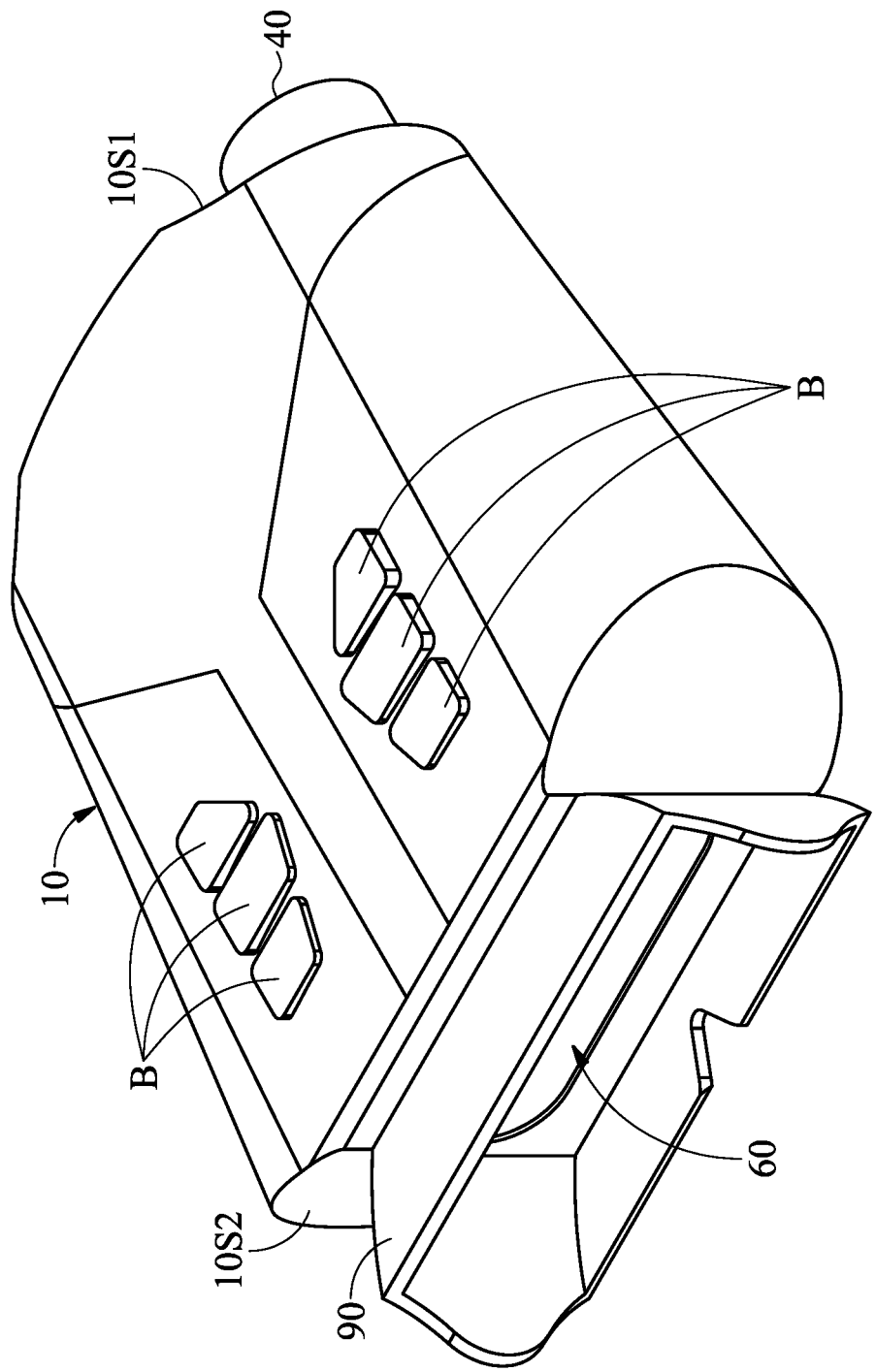
FIG. 2 is a rear perspective view diagram of the optical binocular in FIG. 1.

Referring to FIG. 1 and FIG. 2, which are respectively a front perspective view and a rear perspective view of an optical binocular 100 according to an embodiment of the present invention. As shown in FIGS. 1 and 2, the optical binocular 100 may be a binocular with a light-emitting function, or a night vision binocular which can be used to observe, aim, and zoom in on a scene or target, for example, used for hunting games. The detailed structure of the optical binocular 100 will be described below.

Figure 3:
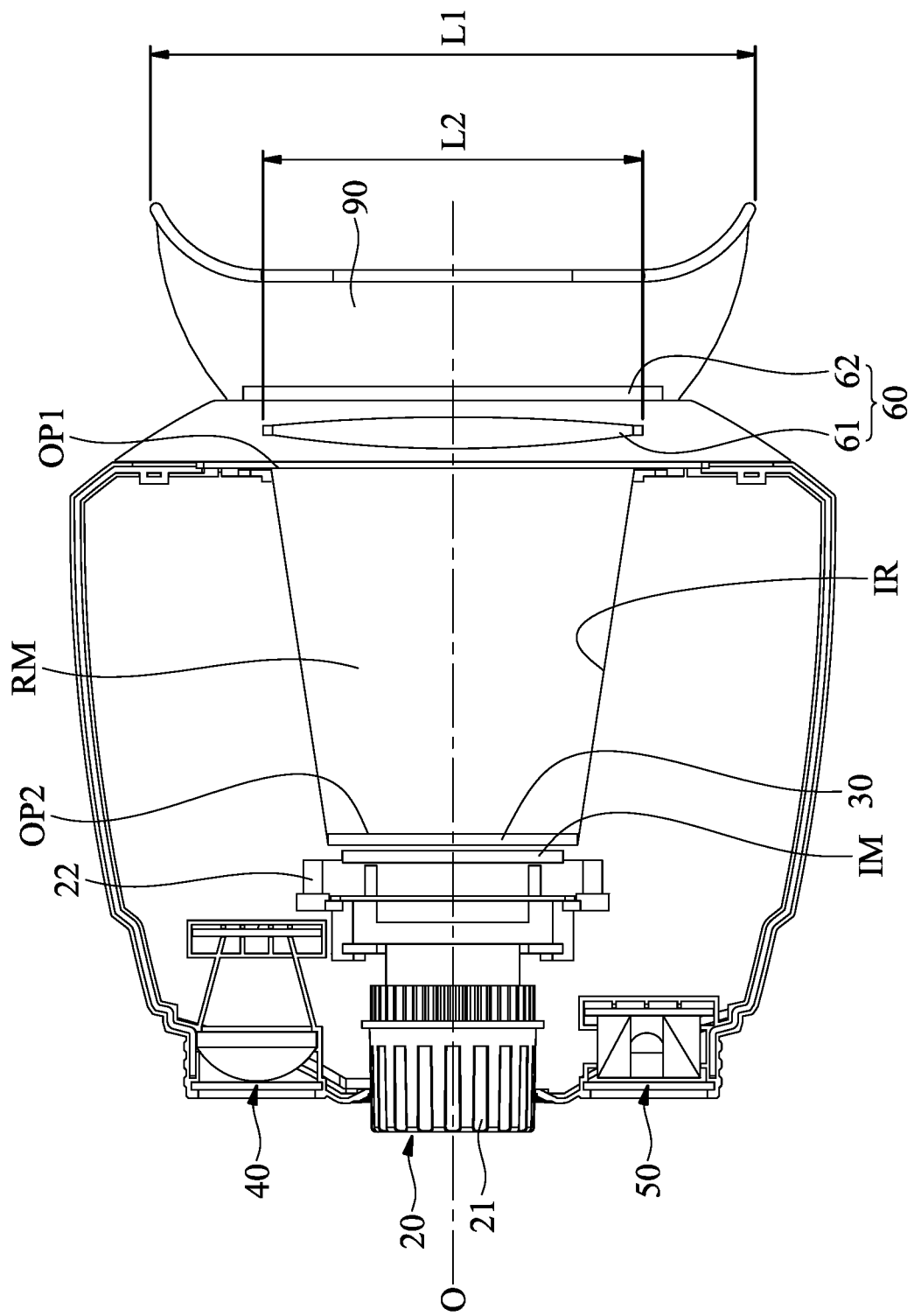
FIG. 3 is a top view schematic diagram of the optical binocular in FIG. 1.

Referring to FIG. 3, the optical binocular 100 includes a main body 10, a lens module 20, a display module 30, a first light source assembly 40, a second light source assembly 50 and an eyepiece assembly 60. The main body 10 includes a first side 10S1 and a second side 10S2 opposite each other. The lens module 20, the first light source assembly 40 and the second light source assembly 50 are disposed on the first side 10S1, the display module 30 is disposed in the main body 10, and the eyepiece assembly 60 is disposed on the second side 10S2.

The optical binocular 100 further includes a plurality of operation buttons B disposed on the upper side of the main body 10. The operation buttons B are electrically connected to the lens module 20, the display module 30, the first light source assembly 40 and the second light source assembly 50. These buttons B are configured to operate the different functions of the aforementioned modules and assemblies (20, 30, 40 and 50). For example, a user can turn on/off the modules and assemblies, adjust the brightness or sight of brightness, zoom in or zoom out the displayed image, or enable the function of taking photos or recording videos.

The aforementioned lens module 20 may be a camera device, which is configured to capture image. The lens module 20 includes a lens element 21, a support frame 22, and a photosensitive element IM (for example, an image sensor). The support frame 22 is configured to support the lens element 21, and the photosensitive element IM can receive light from the outside through the lens element 21 along the optical axis O direction of the lens element 21 to obtain an image. In some embodiments, an integrated circuit such as a complementary metal-oxide semiconductor (CMOS) is provided on the photosensitive element IM. Alternately, in other embodiments, a charge-coupled device (CCD) may be provided on the photosensitive element IM.

The display module 30 can be, for example, a liquid-crystal display having an LCD (liquid-crystal display) panel, electrically connected to the lens module 20, and used to display images acquired by the lens module 20.

The first light source assembly 40 and the second light source assembly 50 are used to emit lights to illuminate the front of the optical telescope 100, that is, the front of the first side 10S1. For example, the first light source assembly 40 and the second light source assembly 50 may be light-emitting assemblies that emit visible lights. In some embodiments, they may also emit infrared (IR) lights.

Figure 4:
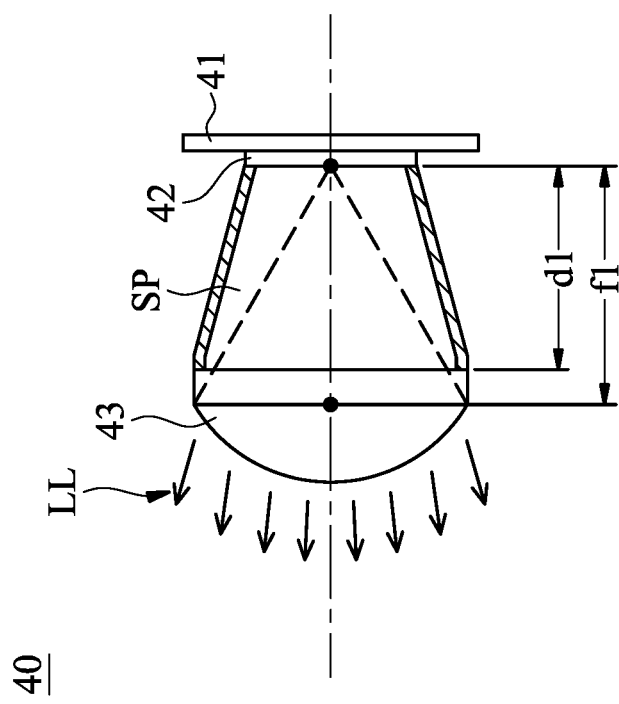
FIG. 4 is a schematic diagram of the first light source assembly.

FIG. 4 shows a schematic diagram of the first light source assembly 40. As shown in FIG. 4, the first light source assembly 40 has a first circuit board 41, a first light source (or first light-emitting unit) 42 and a first lens 43. The first circuit board 41 can be connected to the main circuit board (not shown) of the optical binocular 100 (for example, the main circuit board may be disposed in the main body 10, and located on the top side of the main body 10). The first light source 42 is disposed on the first circuit board 41 for emitting light (first light). There is an accommodating space SP between the first lens 43 and the first light source 42, and this space SP has a tapered structure. A first distance d1 is formed between the first lens 43 and the first light source 42. The light emitted by the first light source 42 passes through the first lens 43, so that a long-range (or distant view) light LL is provided from the optical binocular 100, to illuminate the front of the optical binocular 100. In some embodiments, the first lens 43 is a convex lens, such as a plano-convex lens, but not limit thereto.

Figure 5:
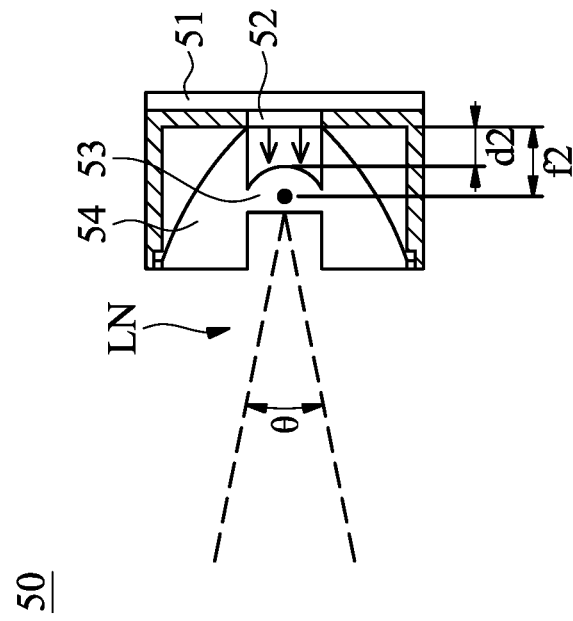
FIG. 5 is a schematic diagram of the second light source assembly.

FIG. 5 shows a schematic diagram of the second light source assembly 50. As shown in FIG. 5, the second light source assembly 50 has a second circuit board 51, a second light source (or second light-emitting unit) 52, a second lens 53 and a condensing (or spotlight) cup body 54. The second circuit board 51 may also be connected to the main circuit board of the optical binocular 100. The first circuit board 41 and the second circuit board 52 may be flexible printed circuit boards, and the second light source 52 is disposed on the second circuit board 51, and configured to emit light (second light). The second lens 53 is disposed in the condensing cup body 54. In some embodiments, the second lens 53 is a convex lens, such as a convexo-plane lens, but not limit thereto. A second distance d2 is formed between the second lens 53 and the second light source 52. The light emitted by the second light source 52 passes through the second lens 53, so that a close-range light LN is emitted from the second light source assembly, to illuminate the front of the optical binocular 100. With the condensing cup body 54 and the second lens 53, the angle θ of the close-range light LN emission is reduced, and the light can be effectively collected to improve the emission effect of the light source. In some embodiments, the emitting angle θ of the close-range light LN is about 15 degrees.

In some embodiments, the first distance d1 is from 18 to 20 mm, and the first distance d2 is from 4.5 to 5.5 mm. In some embodiments, the first distance d1 is at least 12.5 mm greater than the second distance d2.

In some embodiments, the outer radius of curvature of the first lens 43 may be 20 to 25 mm, and the first lens 43 has a focal length (or distance) f1 of 16 to 20 mm. In some embodiments, the focal length f1 is 18 mm. In some embodiments, the outer radius of curvature of the second lens 53 may be 5.5 to 7 mm, and the second lens 53 has a focal length f2 of 5 to 6 mm. In some embodiments, the focal length f2 is 5.5 mm.

In this way, using the first and second lenses 43 and 53 which have two different focal lengths, respectively, the optical binocular 100 can emit a long-range light LL (through the first lens 43) and a near-range light LN (through the second lens 53). This allows the optical binocular 100 to illuminate the positions in front of it at different distances. For example, the first light source assembly 40 emits long light LL to illuminate the position 250~300 yards away from the optical binocular 100; and the second light source assembly 50 emits close light LN to illuminate the position 80~120 yards away from the optical binocular 100. By irradiating the positions at different distances from the optical binocular 100, the optical binocular 100 can have a better field of view, allowing the user to observe a wider scene or target.

It is worth noting that the aforementioned first light source assembly 40 and second light source assembly 50 are disposed on two sides (left and right sides) of the lens module 20. Or, the lens module 20 is located between the first light source assembly 40 and the second light source assembly 50 in the direction that is perpendicular to the optical axis O of the lens module 20.

In some embodiments, the aforementioned first light source 42 and second light source 52 may be visible light or infrared (IR) LED units or combinations, each LED light source may include one or more light emitting diodes, which can emit visible light or infrared light. For example, when using the optical binocular 100 at night, the user can press the operation button(s) B to turn on the first light source assembly 40 and the second light source assembly 50 to operate, to provide visible light or infrared light, and the light is reflected by the target and enters the lens module 20 to capture images. In some embodiments, the first and second light sources 42 and 52 having a plurality of light emitting diodes may be arranged in a matrix (e.g., a 3×3 or 3×4 matrix).

In some embodiments, the lens module 20 further includes a filter element disposed between the lens element 21 and the photosensitive element IM, wherein the filter element has an infrared (IR) light blocking area and a transparent area. When hunting in the daytime, since the ambient light is strong and sufficient, there is no need to use infrared light components, and an infrared blocking area of the filter element is required to filter infrared light from sunlight. When hunting in the early morning or near night, the light is weak or insufficient, so the infrared light component needs to be opened to provide infrared light, and the infrared light blocking area of the filter element should be removed to obtain more light.

Referring to FIG. 3, the eyepiece assembly 60 of the optical binocular 100 is disposed on the second side 10S2 of the main body 10, and includes an eyepiece lens 61 and an eyepiece plane lens 62. The eyepiece plane lens 62 is located outside the eyepiece lens 61 and covers the eyepiece lens 61 to provide a protection function. In some embodiments, the eyepiece lens 61 may be a biconvex lens, wherein the radius of curvature of the convex surface which is farther away from the optical binocular 100 may range from 270 mm to 320 mm, while the radius of curvature of the closer one on another side may range from 90 mm to 135 mm. Viewing the display module 30 in the main body 10 through the eyepiece lens 61 can have a magnifying effect to enhance a good viewing experience.

Please continue to refer to FIG. 3, the optical binocular 100 further includes an observation room RM, disposed in the main body 10. The observation room RM is located between the display module 30 and the eyepiece assembly 60, and has a trapezoidal or tapered structure. The observation room RM includes a first opening OP1 and a second opening OP2, which are respectively adjacent to the eyepiece assembly 60 and the display module 30, wherein the second opening OP2 of the observation room RM is smaller than the first opening OP1. In this embodiment, the user sees the image on the display module 30 through the eyepiece assembly 60 and the observation room RM. Since the observation room RM has a structure that is tapered from the end of the eyepiece toward the display end, the user can more easily concentrate on the image on the display module 30, and the device can provide more comfort during use.

In some embodiments, an inner wall IR of the observation room RM is formed with a scattering structure. The scattering structure may present a wave shape, and is configured to scatter or reflect the light from the display module 30 to provide a better visual experience.

The optical binocular 100 further comprise an eyeshield 90 located on the second side 10S2 of the main body 10. The eyeshield 90 is provided around the eyepiece assembly 60 and covers at least a portion of the eyepiece lens 61. In some embodiments, the eyeshield 90 may be made of silicone to improve comfort. In the long axis direction of the eyeshield 90, the length L1 of the eyeshield 90 is at least 40 mm larger than the length L2 of the exposed eyepiece lens 61 and eyepiece plane lens 62 (that is, the area where the eyepiece lens 61 and eyepiece plane lens 62 are not covered by the eyeshield 90). For example, the length L1 may be 120~130 mm, and the length L2 may be 80~90 mm.

In summary, an optical binocular is provided, including a main body, a lens module, a display module, a first light source assembly and a second light source assembly. The lens module is disposed on one side of the main body. The display module is disposed in the main body and electrically connected to the lens module, and is configured to display an image captured via the lens module. The first light source assembly includes a first light source and a first lens, and emits a first light. The second light source assembly includes a second light source and a second lens, and emits a second light. The first light source emits a long-range light which passes through the first lens, and the second light source emits a close-range light which passes through the second lens, wherein the focal length of the first lens is greater than the focal length of the second lens.

The embodiments of the present invention have at least one of the following advantages or effects. By providing different types of light source components on both sides of the optical binocular, such as the light source assemblies including a condensing cup light source and a plano-convex lens type light source in an embodiment, to achieve the purpose of illuminating different positions in front of the optical binocular, one of the light source assemblies can illuminate a long distance, and the other one light source assembly illuminates a relatively short distance. In this way, the optical binocular has a better field of view, allowing the user to observe a wider scene or target.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical binocular, comprising:
   a main body;
   a lens module, disposed on a side of the main body;
   a display module, disposed in the main body and electrically connected to the lens module, and configured to display an image captured by the lens module;
   a first light source assembly, including a first light source and a first lens, and configured to emit a first light; and
   a second light source assembly, including a second light source, a second lens, and a condensing cup body, and configured to emit a second light;
   wherein the first light source assembly and the second light source assembly are respectively disposed on two sides of the lens module, the first light source emits a long-range light through the first lens, and the second light source emits a close-range light through the second lens, wherein the focal length of the first lens is greater than the focal length of the second lens; and
   wherein the first lens is a plano-convex lens, the first light source emits the long-range light through the plano-convex lens, the second lens is a convexo-plane lens, the second light source irradiates the close-range light through the convexo-plane lens, and the convexo-plane lens is disposed in the condensing cup body.

2. The optical binocular as claimed in claim 1, wherein there is a space between the first light source and the first lens, and the space has a tapered structure.

3. The optical binocular as claimed in claim 1, wherein there is a first distance between the first light source and the first lens, and the first distance is from 18 to 20 mm.

4. The optical binocular as claimed in claim 3, wherein there is a second distance between the second light source and the second lens, and the second distance is from 4.5 to 5.5 mm.

5. The optical binocular as claimed in claim 4, wherein the first distance is greater than the second distance by at least 12.5 mm.

6. The optical binocular as claimed in claim 1, further including an eyepiece assembly, and the main body includes a first side and a second side, and the first side is opposite the second side, the lens module, wherein the first light source assembly and the second light source assembly are disposed on the first side, and the eyepiece assembly is disposed on the second side.

7. The optical binocular as claimed in claim 6, wherein in the direction of an optical axis of the lens module, the display module is disposed between the lens module and the eyepiece assembly.

8. The optical binocular as claimed in claim 6, wherein the eyepiece assembly has an eyepiece lens, and the eyepiece lens is a biconvex lens.

9. The optical binocular as claimed in claim 6, wherein there is an observation room between the display module and the eyepiece assembly, the observation room has a first opening and a second opening, the first opening is adjacent to the eyepiece assembly, the second opening is adjacent to the display module, wherein the second opening is smaller than the first opening.

10. The optical binocular as claimed in claim 9, wherein the observation room has an inner wall, and the inner wall has a scattering structure.

11. The optical binocular as claimed in claim 1, further comprising a plurality of buttons disposed on the upper side of the body, wherein the buttons are configured to operate the lens module, the display module, the first light source assembly and the second light source assembly.

12. The optical binocular as claimed in claim 1, wherein the display module has a liquid-crystal display (LCD) panel.

* * * * *